United States Patent
Hirthammer

(10) Patent No.: US 11,793,186 B2
(45) Date of Patent: Oct. 24, 2023

(54) AGRICULTURAL DISTRIBUTION MACHINE

(71) Applicant: HORSCH LEEB Application Systems GmbH, Landau an der Isar (DE)

(72) Inventor: Daniel Hirthammer, Schwandorf (DE)

(73) Assignee: HORSCH LEEB Application Systems GmbH, Landau an der Isar (DE)

( * ) Notice: Subject to any disclaimer, the term of this patent is extended or adjusted under 35 U.S.C. 154(b) by 462 days.

(21) Appl. No.: 17/066,933

(22) Filed: Oct. 9, 2020

(65) Prior Publication Data
US 2021/0105993 A1 Apr. 15, 2021

(30) Foreign Application Priority Data

Oct. 10, 2019 (DE) .......................... 102019127301.3

(51) Int. Cl.
| | | |
|---|---|---|
| A01M 7/00 | (2006.01) | |
| A01C 23/04 | (2006.01) | |
| A01C 7/08 | (2006.01) | |
| A01C 23/00 | (2006.01) | |

(52) U.S. Cl.
CPC .............. *A01M 7/0042* (2013.01); *A01C 7/08* (2013.01); *A01C 23/007* (2013.01); *A01C 23/047* (2013.01); *A01M 7/0071* (2013.01); *A01M 7/0089* (2013.01)

(58) Field of Classification Search
CPC .............. A01M 7/0042; A01M 7/0071; A01M 7/0089; A01M 23/047; A01M 7/08; A01M 23/007
See application file for complete search history.

(56) References Cited

U.S. PATENT DOCUMENTS

| | | | |
|---|---|---|---|
| 4,790,484 A | * | 12/1988 | Wall ....................... A01C 15/04 239/168 |
| 9,832,925 B2 | | 12/2017 | Leeb |
| 10,244,747 B2 | | 4/2019 | Leeb et al. |
| 10,470,361 B2 | | 11/2019 | Leeb et al. |

(Continued)

FOREIGN PATENT DOCUMENTS

| | | |
|---|---|---|
| DE | 202014011019 U1 | 6/2017 |
| EP | 2591657 A1 | 5/2013 |

(Continued)

*Primary Examiner* — Tuongminh N Pham
(74) *Attorney, Agent, or Firm* — AVEK IP, LLC; Kent R. Erickson

(57) ABSTRACT

An agricultural distribution machine that includes a carrier vehicle with a distributor boom that is movable at least about a pivot axis is described. The machine also includes a controlling apparatus that generates a controlling force to move the distributor boom about the pivot axis. A first sensor apparatus detects an angular rate ($\omega$) of the distributor boom. The control apparatus implements a first operating mode to hold the distributor boom in a currently set target rotational position in which disturbance torques acting on the distributor boom, resulting from movements of the carrier vehicle about the longitudinal axis, are compensated. In the first operating mode, the control apparatus is configured to regulate the angular rate ($\omega$) detected by the first sensor apparatus as a controlled variable to a target value which has an absolute value of between zero and a threshold value ($\omega_0$).

22 Claims, 8 Drawing Sheets

(56) References Cited

U.S. PATENT DOCUMENTS

| | | | |
|---|---|---|---|
| 2014/0197297 A1* | 7/2014 | Ito | A01B 63/1006 |
| | | | 248/550 |
| 2016/0205864 A1* | 7/2016 | Gattis | A01C 23/008 |
| 2016/0255769 A1* | 9/2016 | Leeb | A01C 23/007 |
| 2016/0286780 A1 | 10/2016 | Leeb et al. | |
| 2018/0110213 A1* | 4/2018 | Oberheide | A01M 7/0057 |

FOREIGN PATENT DOCUMENTS

| | | |
|---|---|---|
| EP | 3007553 B1 | 9/2014 |
| EP | 3183963 A1 | 6/2017 |
| WO | 2015067804 A1 | 5/2015 |

\* cited by examiner

AGRICULTURAL DISTRIBUTION MACHINE

CROSS-REFERENCE TO RELATED APPLICATIONS

This application claims the benefit of German Patent Application No. DE 102019127301.3, filed Oct. 10, 2019, the disclosure of which is hereby incorporated herein in its entirety by reference.

BACKGROUND

Exemplary embodiments relate to an agricultural distribution machine, preferably a field sprayer or a pneumatic fertilizer spreader.

Generic agricultural distribution machines comprise a carrier vehicle, a distributor boom for spreading material, such as a fertilizer, plant protection agents, or seeds, which is indirectly or directly arranged on the carrier vehicle so as to be movable at least about a pivot axis running in the direction of travel and a control apparatus for controlling and/or regulating a rotational position of the distributor boom about the pivot axis.

In order to spread the material over a large surface area on the agricultural field to be cultivated, distributor booms of such field sprayers or pneumatic fertilizer spreaders have lateral cantilevered arms with a large working width, in some cases of more than twenty meters, on which spreading means are arranged, for example spray nozzles in field sprayers or deflector plates in pneumatic fertilizer spreaders. For transport journeys, such wide spraying booms are folded and collapsed.

For efficient spreading, in particular for a coverage of the ground with material which is as uniform as possible, the distance between the distributor boom and the agricultural field is designed to remain as uniform as possible over the entire working width. For this reason, in the case of increasing dimensions of the cantilevered arms and the working width associated therewith, there is the need to guide the spraying boom at a distance from the ground which is as uniform as possible, since even small oblique positions of the spraying boom will lead to significant differences in the distance of the spreading means along the distributor boom, for example the spray nozzles, from the ground. Inadvertent fluctuations of the distributor boom may also increase undesired drift of the material to be spread.

To this end, it is known to suspend a distributor boom on a carrier vehicle so as to be rotatable about a central point, at least about a rotational axis. The rotational axis in this case preferably runs parallel to the longitudinal axis and/or to the direction of travel of the carrier vehicle. In order to ensure a uniform spreading of the material, the distance between the upper edge of the plant population and the spreading means is continuously regulated to a defined distance.

In this case, a plurality of approaches are known from the prior art in order to hold the distributor boom as far as possible in the desired target rotational position, to detect deviations from the target rotational position and in the case of deviations of the distributor boom to return the distributor boom back to the target rotational position by means of a controlling apparatus.

By way of example, reference is made to EP 2 591 657 B1. It is proposed therein to provide a controlling apparatus, the rotational position of the distributor boom being able to be altered thereby and said controlling apparatus optionally being able to be operated in a first operating mode or a second operating mode. In this case, a substantially controlling force-free mechanical connection is produced in a first operating mode in which the spreading boom is substantially decoupled from torques about the pivot axis through the suspension point, resulting from vehicle movements about the vehicle longitudinal axis. The controlling force-free connection may be produced and maintained, for example, by means of controlling movements of the controlling apparatus approximately following in real time the relative movements between the spreading boom and/or the central part thereof and the carrier vehicle. In a second operating mode a defined controlling force and/or a defined controlling torque may be introduced into the distributor boom for the displacement thereof.

By way of example reference is also made to EP 3 007 553 B1. For the accurate determination of the rotational position of the distributor boom about the pivot axis, it is proposed by time integration of a rotational speed detected by an angular rate sensor, to calculate a rotational position of the distributor boom and to combine the calculated rotational position with a directly measured rotational position of a rotation angle sensor for determining a present rotational position of the boom. Using the rotational position thus determined, the rotational position of the distributor boom is regulated or controlled.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes, among other things, an improved approach for controlling and/or regulating a rotational position of a distributor boom of an agricultural distribution machine by which drawbacks of conventional techniques may be avoided. Another object is, in particular, to provide a particularly accurate and at the same time cost-efficient technique for controlling and/or regulating a rotational position of a distributor boom of an agricultural distribution machine.

From a general point of view, the present disclosure relates to an agricultural distribution machine, also denoted hereinafter in short as a distribution machine. This distribution machine comprises a carrier vehicle and a distributor boom for spreading material, such as a fertilizer, a plant protection agent or seed. The distributor boom is indirectly or directly arranged on the carrier vehicle so as to be movable at least about a pivot axis running in the direction of travel of the carrier vehicle. The pivot axis may be a pivot axis which extends in the longitudinal direction of the carrier vehicle. The distributor boom has a large working width, i.e. a working width that is substantially greater than a width of the carrier vehicle, for example a multiple of the width of the carrier vehicle. The working width of the distributor boom, i.e. the width in the working position or in the fully folded-out state, may be at least 18 meters. The distribution machine further comprises a controlling apparatus, a controlling force being able to be generated thereby in order to move the distributor boom about the pivot axis.

The distribution machine further comprises a sensor apparatus for determining an angular rate of the distributor boom. The sensor apparatus is also denoted hereinafter as the first sensor apparatus in order to differentiate more clearly from a second sensor apparatus described further hereinafter for detecting a rotational position of the distributor boom.

The distribution machine further comprises a control apparatus for controlling and/or regulating a rotational position of the distributor boom about the pivot axis. The control apparatus is configured to activate the controlling apparatus for controlling and/or regulating the rotational position of the distributor boom about the pivot axis preferably by use of corresponding controlling signals generated by the control apparatus.

The control apparatus is configured to implement a first operating mode to hold the distributor boom in a currently set target rotational position in which disturbance torques acting on the distributor boom resulting, for example, from rolling movements of the carrier vehicle about the longitudinal axis, are counteracted or compensated to hold (maintain) the target rotational position. In addition to disturbance torques that are generated by rolling movements of the carrier vehicle, further disturbance torques acting on the distributor boom may be offset or compensated in the first operating mode, such as disturbance torques generated by wind. The first operating mode therefore serves to maintain an already set target rotational position, by compensating, as rapidly as possible, for deviations from the target rotational position due to disturbance torques.

In one embodiment, in the first operating mode the control apparatus is configured to regulate the angular rate detected by the first sensor apparatus using a calculated value between a controlled variable and a target value which has an absolute value of between zero and a threshold value. Based on this calculated value corresponding controlling signals for activating the controlling apparatus may be determined. In other words, the angular rate is controlled to remain within a target range around zero, the lower and upper limits of the target range are defined by the threshold value. Assuming that the threshold value has the value $\omega_0$, the angular rate is being controlled to target values or a target range between $-\omega_0$ and $+\omega_0$, i.e. the angular rate is controlled to values, the absolute value of which are between zero and the threshold value. The angular rate (angular velocity), describing how fast the rotational position changes with time, is thus used according to the invention instead of the rotational position in order to identify and/or to predict deviations of the current rotational position of the distributor boom from the desired target rotational position.

The direct use of the angular rate as a controlled variable for regulating a rotational position of a distributor boom to a target rotational position permits, in comparison with approaches known from the prior art, an accurate and at the same time cost-efficient approach for regulating the rotational position of the distributor boom to a target rotational position.

This is because approaches that use the determined rotational position as the controlled variable are in some cases more inaccurate, since a rotational position determined by a conventional inclinometer is prone to error due to external accelerations which act in addition to the gravitational acceleration on the inclinometer apparatus, such as transverse accelerations. If the rotational position is calculated by time integration from a measured angular rate, however, such a calculated rotational position is subjected in the known manner to the problem of so-called angle drift. Because temporal measurement errors are incorporated therein, this approach is generally also more inaccurate. More specifically, such inaccuracies may be avoided when the rotational position is measured both directly by an inclinometer and is calculated via a time integration and the two measured variables are combined (fused) via sensor data fusion to reduce the drawbacks of the two measuring methods. In comparison therewith, however, according to the approach according to the invention such a time integration and data fusion may be avoided.

In one embodiment for implementing the first operating mode, the control apparatus is configured exclusively to use the angular rate detected by the first sensor apparatus as the controlled variable. In other words, only the measured angular rate of the distributor boom is used to identify (in the first operating mode) whether deviations of the distributor boom from the target rotational position are present and/or would occur imminently without a regulating intervention. This permits a rapid and cost-effective implementation of the first operating mode since additional sensor variables and/or controlled variables and the processing thereof may be dispensed with. According to one embodiment, the control apparatus may be configured in the first operating mode to identify and reduce disturbance movements of the distributor boom only using the measured angular rate. Thus a current rotational position of the distributor boom may be maintained since in the first operating mode it is assumed that the current rotational position coincides with the target rotational position and this target rotational position is intended to be held. Detected rotational movements thus represent disturbance movements resulting from disturbance torques. It is, therefore, not possible to determine a current rotational position of the boom directly by means of the angular rate, without further processing. This is not necessary, however, in the first operating mode, since here it is a case of holding the current rotational position and also very rapidly and reliably reducing disturbance movements, which the approach described herein advantageously permits.

It is emphasized that this embodiment does not exclude that in other operating situations or in other operating modes further sensor variables are used, for example, in order to fix the target rotational position of the distributor boom or to determine the actual rotational position in comparison with the target rotational position. Thus, for example, distance sensors that measure the distance of the distributor boom from the ground or a plant population may be used. A changing inclination of the ground profile may be identified, for example, by such distance sensors, which are designed for example as ultrasonic sensors arranged on the distributor boom, and accordingly a new target rotational position may be fixed if required. In a second operating mode, the distributor boom may be set to this new target rotational position. After reaching the new target rotational position the second operating mode is terminated and subsequently in the first operating mode a regulation of the boom rotational position is carried out on the basis of the measured angular rate to hold the new target rotational position.

The first sensor apparatus may be arranged on a central part of the distributor boom.

In another exemplary embodiment, the first sensor apparatus is designed as an angular rate sensor that detects a rotational speed of the distributor boom. The angular rate sensor may be designed as a gyroscope. The angular rate sensor, for example the gyroscope, may be arranged on the central part of the distributor boom.

According to an embodiment, the threshold value may be fixed to a value which is lower than 0.1 rad/s. This range has proved to be particularly advantageous in order to prevent "overregulation" so that a small range of angular rates is permitted, which in typical operating processes of such distribution machines generally result in no deviations or no noticeable deviations from the target rotational position.

Typical disturbance torques often lead to positive and also negative fluctuations of the angular rate about the zero point so that if they are not above a threshold value, these fluctuations are generally averaged out.

According to a variant of this embodiment the threshold value may be fixed to a value which is lower than 0.05 rad/s, or further preferably lower than 0.025 rad/s. Whilst these variants increase the control complexity slightly, they avoid in a more reliable the possibility manner that even small disturbance movements may accumulate to lead to an undesired deflection from the target rotational position.

There is also a possibility that the threshold value is fixed to zero. According to this embodiment, in the first operating mode a regulating intervention is undertaken with each measured deviation of the angular rate from zero. This provides the advantage that it is avoided that even very small deviations from zero over a certain length of time lead to an undesired deviation from the target rotational position.

According to a further embodiment, the agricultural distribution machine may comprise a sensor apparatus for detecting a rotational position of the distributor boom, which is denoted hereinafter as the second sensor apparatus. The second sensor apparatus may be configured to detect a relative rotation between the carrier vehicle and the distributor boom. To this end, the second sensor apparatus may comprise a rotation angle sensor arranged between the carrier vehicle and the distributor boom. To this end, a base position of the distributor boom may be determined relative to a reference plane, which corresponds to a position of the distributor boom relative to the carrier vehicle. Alternatively or additionally, the second sensor apparatus may comprise a displacement path measuring apparatus of the controlling apparatus that is configured to detect a displacement path of the controlling apparatus. Thus for example, in the case of a displacement cylinder where the displacement path corresponds to the movement path of the piston therein, via the detection of the displacement path, conclusions may also be drawn about the rotation of the distributor boom and thus the rotation thereof relative to the carrier vehicle.

Alternatively or additionally, the second sensor apparatus may be configured to determine a rotational position of the distributor boom relative to the direction of gravitational acceleration or to the horizontal and comprise a rotation angle sensor arranged on the distributor boom. The inclinometer may be an inclinometer of the gravity type, i.e. an inclinometer that measures a direction of the distributor boom relative to the gravitational acceleration. Alternatively or additionally, the second sensor apparatus may comprise a distance sensor unit arranged on the distributor boom, for example an ultrasonic sensor unit, wherein the distance sensor unit is configured to detect a distance of the distributor boom from the ground and/or plant population. A rotational position of the distributor boom relative to the horizontal may also be determined from this distance.

A rotational position of the distributor boom may be measured by way of the second sensor apparatus, for example, to set the current rotational position to a new target rotational position in a second operating mode. Preferably it is provided, however, that in the first operating mode only the measured angular rate is used as the controlled variable in order to compensate for disturbance torques which generate or would generate deviations of the rotational position of the distributor boom from the target rotational position.

It has already been mentioned above that a second operating mode may be implemented in addition to the first operating mode. The second operating mode may serve to change in a targeted manner the rotational position of the distributor boom in order to set the rotational position to a new target value. For example, when travelling into a sloping region the rotational position of the distributor boom is designed to be adapted to be realigned parallel to the changed terrain profile. In this case, a new target rotational position may be determined and set during the course of a second operating mode. In this case, in the second operating mode, by means of the controlling apparatus a controlling force may be introduced into the distributor boom for rotating the distributor boom until the new target rotational position is set. After reaching the new target rotational position it is possible to change back to the first operating mode to hold this new target rotational position.

The controlling apparatus may be configured as a pressure medium-actuated controlling apparatus, for example as a pneumatically or hydraulically operating controlling apparatus.

Moreover, the pressure medium-actuated controlling apparatus may be designed as a pressure medium-actuated controlling apparatus with two substantially opposingly acting effective regions, a controlling force being able to be generated thereby in order to move the distributor boom about the pivot axis. In this case, a pressure medium control valve is assigned to each effective region for controlling a pressure or volumetric flow prevailing on the respective effective region. The pressure medium-actuated controlling apparatus comprises at least one pressure medium-actuated actuator.

The "effective region" of the controlling apparatus and/or of the actuator is understood as a region of the controlling apparatus and/or the actuator in which the compressive force of the pressure medium is converted or may be converted into a movement of a controlling member of the controlling apparatus and/or of the actuator. It is intended to be understood by "two substantially opposingly acting" effective regions that a compressive force of the pressure medium in the one effective region generates a displacement force on the distributor boom in the one direction about the pivot axis, and a compressive force of the pressure medium in the other effective region generates a displacement force on the distributor boom in the opposing direction about the pivot axis. In other words, a pressure medium control valve may be used for pivoting the distributor boom in each direction (clockwise or counter-clockwise).

The control apparatus is also configured to determine, as a function of the detected angular rate of the distributor boom, a predetermined target value of a pressure acting on the effective regions or a controlling force (compressive force) of the pressure medium acting on the effective regions and to set the pressure medium control valves, in each case by being electrically controlled, to the predetermined target value.

This embodiment of the agricultural distribution machine provides the particular advantage that the pressure medium control valves, in combination with the angular rate-based control approach in the first operating mode for holding a predetermined target rotational position, permit a particularly accurate and rapid control of the forces acting on the effective regions for counteracting an (undesired) disturbance movement occurring and reducing a corresponding displacement of the distributor boom.

According to one embodiment, the control apparatus may also be configured to set the pressure medium control valves to the predetermined target value, in each case being electrically controlled using a predetermined characteristic curve of the pressure medium control valves. The characteristic curve of the pressure medium control valves establishes a connection between the predetermined target value, for example the pressure at the effective regions, and the electrical activation signal, for example the current applied, of the pressure medium control valves. This has the advantage that via the characteristic curve of the pressure medium control valves, the pressure on the distributor boom may be adapted accurately to the predetermined target value.

As a result, the pressure medium control valves operate such that the desired predetermined target value is set on the respective effective region, for example, where the desired pressure or volumetric flow is set. The characteristic curve may be stored in the control apparatus or a data store of the agricultural machine. It is possible to store a characteristic curve which applies to the two pressure medium control valves, if these pressure medium control valves are designed, for example, to be structurally the same. Moreover, a separate characteristic curve may be stored for each pressure medium control valve.

In one embodiment, the predetermined target value is determined from the angular rate and is used to determine which pressure or volumetric flow of the pressure medium is required at the effective regions based on the characteristic curve of the electrical activation signal of the pressure medium control valves, for example the current applied thereto. The predetermined target value may thus be used for the active control and/or regulation of the rotational position of the distributor boom. When a defined difference in pressure or a defined difference in force is intended to prevail at the effective regions, the pressure medium control valves which preferably operate in opposing directions are accordingly activated electrically on the basis of the characteristic curve(s) stored in the control apparatus, thus generating a defined difference in pressure and/or a defined difference in force.

The detection of disturbance movements of the distributor boom and the reduction of the disturbance movements using the regulation of the angular rate in the first operating mode makes it possible to determine without significant delays, an accurate predetermined target value of the pressure acting on the effective regions or the controlling force of the pressure medium acting on the effective regions for the electrical activation of the pressure medium control values. This also results in the possibility to provide a technique for controlling and/or regulating the rotational position of the distributor boom, in which optionally no pressure sensors, force sensors and/or the like which are coupled to the pressure medium-actuated controlling apparatus are required. Accordingly, an embodiment provides that no pressure medium sensor, in particular no pressure sensor and/or no differential pressure sensor, is arranged in the pressure medium circuit outside the pressure medium control valves, in particular the pressure medium line sections of the pressure medium-actuated controlling apparatus and/or is used for activating the pressure medium control valves. Naturally the pressure medium control valves, for example pressure control valves, may have an integrated pressure sensor unit, i.e. a pressure sensor unit arranged inside the pressure control valves, in order to regulate the pressure. Alternatively or additionally, an embodiment may provide that the pressure medium-actuated controlling apparatus has no sensor that detects a deflection of a controlling member of the controlling apparatus or a force acting on the controlling member, wherein the controlling apparatus preferably to this end has no path sensor, no extension sensor and no force sensor.

A particular advantage of these embodiments is that a particularly cost-efficient construction is permitted. This is at least in part because regulating or controlling the rotational position of the distributor boom in the first operating mode, i.e. holding a target rotational position even with occurring disturbance torques, preferably uses only the first sensor apparatus for detecting disturbance torques of the boom, and in addition to the pressure medium control valves no further pressure sensor unit or force sensors coupled to the controlling apparatus or integrated therein, are required.

Accordingly in a further embodiment, the control apparatus is configured to determine the predetermined target value without a pressure value or volumetric flow value of the pressure medium detected by a sensor. Moreover, the control apparatus in the first operating mode may be configured to determine a control current for activating the pressure medium control valves exclusively using the characteristic curve and the angular rate of the distributor boom detected by means of the first sensor apparatus. This provides the advantage that a particularly efficient control and/or regulation of the rotational position of the distributor boom is possible.

According to a further embodiment of the agricultural distribution machine with the pressure medium-actuated controlling apparatus, the controlling apparatus (8) may be configured, when activated by a constant controlling signal by the controlling apparatus, to compensate automatically for pressure fluctuations in the pressure medium circuit by means of the pressure control valves. An activation of the controlling apparatus by a constant controlling signal may mean that the control apparatus does not alter the current applied to the pressure control valves in this phase.

Alternatively or additionally, according to a further embodiment of the agricultural distribution machine it may be provided with the pressure medium-actuated controlling apparatus that the control apparatus is configured, if the determined angular rate is lower than the threshold value, to hold constant an electrical activation signal of the pressure medium control valves assigned to the predetermined target value. Further, the control apparatus is preferably configured such that, for example, pressure peaks or force fluctuations on the effective regions caused by rolling movements of the carrier vehicle or by boom movements are automatically compensated by the pressure medium control valves and/or by the pressure predetermined on the basis of the predetermined target value or the correspondingly predetermined force being held constant.

A particular advantage of this embodiment, therefore, is that two overlapping regulating circuits are used for holding the target rotational position in the first operating mode in which a first internal regulating circuit of the controlling apparatus implemented by the pressure medium control valves automatically compensates for pressure peaks or force fluctuations on the effective regions by the pressure medium control valves, as long as the electrical activation signal of the pressure medium control valves is held constant. Secondly, a second regulating circuit in which the control apparatus activates the controlling apparatus as a function of the detected angular rate, in order to regulate by means of the controlling apparatus the detected angular rate as a controlled variable to a target value which has a value of between zero and a threshold value.

The combination of these two regulating circuits makes it possible to provide a particularly rapid, accurate, and structurally relatively simple regulation of the distributor boom which may even reliably compensate for rapidly changing disturbance torques, without these disturbance torques leading to noticeable undesired changes in the rotational position of the distributor boom.

Correspondingly, if the determined rotational position corresponds to a target rotational position of the distributor boom and/or no longer deviates by a threshold value from the target rotational position, the control apparatus may be configured to implement the first operating mode in which the distributor boom is substantially decoupled from torques about the pivot axis resulting from vehicle movements about the vehicle longitudinal axis, wherein an electrical activation signal of the pressure medium control valves corresponding to the predetermined target value is held constant.

It has already been established above that the control apparatus may be configured to implement a second operating mode in order to set the rotational position of the distributor boom in a targeted manner to a new target rotational position. According to a further embodiment, the control apparatus is configured in the second operating mode to determine for each of the effective regions a new predetermined target value in order to generate the controlling forces required for displacing the rotational position.

According to one possible variant, the control apparatus may be configured in the second operating mode to determine the following predetermined target values for each of the effective regions: a predetermined target value hereinafter denoted as the first predetermined target value, which effects a movement of the distributor boom toward the target rotational position; a further predetermined target value, hereinafter denoted as the third predetermined target value, which implements a holding of the distributor boom in the target rotational position, and at least one further predetermined target value, hereinafter denoted as the second predetermined target value, the value thereof being between the first and the third predetermined target value. According to this further embodiment, the control apparatus is configured to set the pressure medium control valves, in each case electrically controlled, initially to the first predetermined target value, then before reaching the target rotational position to the at least one second predetermined target value and when reaching the predetermined target value to the third predetermined target value.

This provides the advantage that with a displacement of the distributor boom into the desired target rotational position, the distributor boom is actively braked and/or damped before reaching the target rotational position so that a rapid setting of the target rotational position, as far as possible without, or with little, overshooting, is possible, wherein to this end advantageously the pressure medium valves only have to be set, by being electrically activated, to the first, second, and third predetermined target value. The target rotational position, for example, may be determined by means of distance sensors which are arranged on the distributor boom and which measure the distance of the distributor boom from the ground or plant population, which has already been mentioned above. The distance sensors may be designed as ultrasonic sensors.

In order to implement a particularly advantageous activation of the pressure medium control valves in terms of control or regulating technology, in this case optionally it may be further provided that the setting of the pressure medium control valves to the first, second and third predetermined target value is carried out using the predetermined characteristic curve, as mentioned above. Preferably, in this case this activation of the pressure medium control valves may be carried out exclusively using the predetermined characteristic curve. This means that the electrical activation values, for example the values of current applied, for the pressure medium valves, which in each case correspond to the first predetermined target value, the at least one second predetermined target value and the third predetermined target value, are determined using the characteristic curve, and the pressure medium control valves are then correspondingly activated only on the basis of these activation values.

According to a variant of this embodiment, it is provided that a plurality of second predetermined target values are determined for each effective region, preferably such that starting from the first predetermined target value, the third predetermined target value is set to rise or fall in a stepwise manner by means of the second predetermined target values. As a result, the target rotational position may be set in a particularly accurate manner and overshooting may be avoided in a particularly reliable manner.

Instead of a stepwise and/or stepped setting of the transition from the third predetermined target value, starting from the first predetermined target value, a plurality of second predetermined target values may also be determined so that a continuous, or approximately continuous, transition is implemented. In practice, however, it has been shown within the scope of the invention that due to the relatively high inertia of the distributor boom, a few second predetermined target values are sufficient.

Alternatively or additionally, the control apparatus may be configured to fix the at least one second predetermined target value, preferably the number thereof and/or deviation from the first and third predetermined target value, as a function of the deviation of the determined rotational position from the target rotational position of the distributor boom. As a result, the setting of the desired target rotational position may be further improved.

According to a particularly advantageous embodiment, the pressure medium control valves are designed as pressure control valves, for example as electromagnetically activated proportional pressure control valves. As an alternative to a pressure regulation at the effective regions, a volumetric flow regulation may also be implemented. According to this variant, the pressure medium control valves may be designed as volumetric flow control valves, for example as electromagnetically activated volumetric flow control valves.

In one embodiment, the controlling apparatus may comprise a dual-acting fluidic pressure medium cylinder, for forming the two substantially opposingly acting effective regions. Alternatively, the controlling apparatus may comprise two single-acting, fluidic pressure medium cylinders which operate opposingly, for forming the two substantially opposingly acting effective regions. In a particularly advantageous variant, the two single-acting fluidic pressure medium cylinders which operate opposingly may be designed in each case as plunger cylinders.

The aforementioned fluidic pressure medium cylinders may be designed as hydraulically operating or pneumatically operating pressure medium cylinders.

According to an embodiment, the controlling apparatus is configured to move the distributor boom optionally in both rotational directions about the pivot axis running in the direction of travel at an angular velocity of at least 0.1 rad/s, further preferably of at least 0.2 rad/s. To this end, the controlling apparatus may be designed accordingly, for example by a travel speed of the controlling member of the controlling apparatus acting on the boom, for example of a hydraulic or pneumatic cylinder, being selected to be correspondingly high, taking into account the effective lever arm of the controlling member.

It has already been mentioned above that the pressure medium control valves in combination with the regulation, carried out in the first operating mode of the angular rate detected by the first sensor apparatus as a controlled variable, to a target value which is between zero and a threshold value, permit a particularly accurate and rapid control of the forces acting on the effective regions for counteracting an inclination which occurs or for intentionally displacing the distributor boom. To this end it is highly advantageous to compensate rapidly for any disturbance torques or pressure peaks on the effective regions introduced into the distributor boom, before they lead to an undesired alteration of the rotational position of the distributor boom. This may be implemented in a reliable manner by such a controlling apparatus, achieved at the angular velocities of at least 0.1 rad/s, further preferably at least 0.2 rad/s of the distributor boom about the pivot axis. According to an advantageous feature, therefore, the controlling apparatus is configured to be able to move the distributor boom about the pivot axis optionally at angular velocities which are at least in the order of 0.1 rad/s or at least 0.2 rad/s. Moreover, the controlling apparatus may be configured to achieve travel speeds which range between 100 m/s and 500 m/s.

Moreover, one respective pressure medium line section may be connected to each effective region of the controlling apparatus, the pressure medium being able to be supplied thereby to the effective regions and discharged therefrom. In this case, one of the pressure medium control valves for controlling a pressure or volumetric flow prevailing at the respective effective region is arranged in each pressure medium line section. It may also be provided that in each case the pressure medium control valves are not assigned a check valve, i.e. according to this variant a check valve is not arranged in a pressure medium line section comprising the pressure medium valve.

The agricultural distribution machine may be a field sprayer. According to this embodiment, the distributor boom is a spraying boom with cantilevered arms protruding on either side of the carrier vehicle as well as spreading means, which are arranged thereon and which are connected and/or connectable to a reservoir for at least one liquid and/or solid active agent, such as for example spray nozzles connected and/or connectable to a spraying agent tank.

The agricultural distribution machine may be a pneumatic fertilizer spreader. The fertilizer spreader may be a fertilizer spreader for distributing granular fertilizer. The fertilizer spreader may comprise a storage container for the fertilizer to be distributed. The fertilizer spreader may comprise a plurality of distribution elements arranged on the distributor boom for spreading granular fertilizer. The distribution elements may in each case comprise a deflector plate.

The agricultural distribution machine may be configured as a self-propelled agricultural distribution machine or as an agricultural distribution machine which is couplable and/or towed by means of a traction vehicle or as an agricultural distribution machine which may be attached and/or is attached to a traction vehicle. The self-propelled distribution machine may additionally be an autonomously travelling agricultural machine, for example a fully autonomously or partially autonomously travelling agricultural machine.

The distributor boom, which is arranged indirectly or directly on the carrier vehicle so as to be movable at least about a pivot axis running in the direction of travel, may be mounted on a carrier which in turn is coupled, for example, to a structural or frame portion or a frame construction of the carrier vehicle and/or to a rigidly or movably mounted support portion of the carrier vehicle. Moreover, the carrier may be attached in a height-adjustable manner to the structural or frame portion or a frame construction of the carrier vehicle, wherein the height adjustment may be carried out, in particular, by means of a four-point linkage attached between the frame construction and the carrier, for example in the form of a parallelogram. The height adjustment may also be carried out by means of a linear carriage attached between the frame construction and the carrier. For the height adjustment, the parallelogram or the linear carriage, for example, may be assigned a linear drive in the form of a hydraulic or pneumatic cylinder, so that the vertical distance between the distributor boom and a ground surface and/or a plant population is able to be altered in a variable manner.

The pivot axis may also be configured, for example, by a ball joint. The ball joint permits not only a pivoting about the pivot axis but also about a further axis.

The distributor boom may have a central part and lateral cantilevered arms which are arranged so as to be pivotable about upright, i.e. vertical, axes relative to the central part, wherein the cantilevered arms may be composed of two or more segments, in turn pivotably arranged relative to one another about upright axes. Alternatively or additionally, there is the possibility that the cantilevered arms and preferably also the segments thereof are pivotable relative to the central part in a plane arranged perpendicular to the forward direction of travel of the distribution machine for improved adaptation to a ground profile. The latter means that the segments may be pivotable relative to one another about an axis running in the direction of travel.

DESCRIPTION OF THE DRAWINGS

Illustrative embodiments are described in detail below with reference to the attached drawing figures, and wherein.

DETAILED DESCRIPTION

Figure 1:
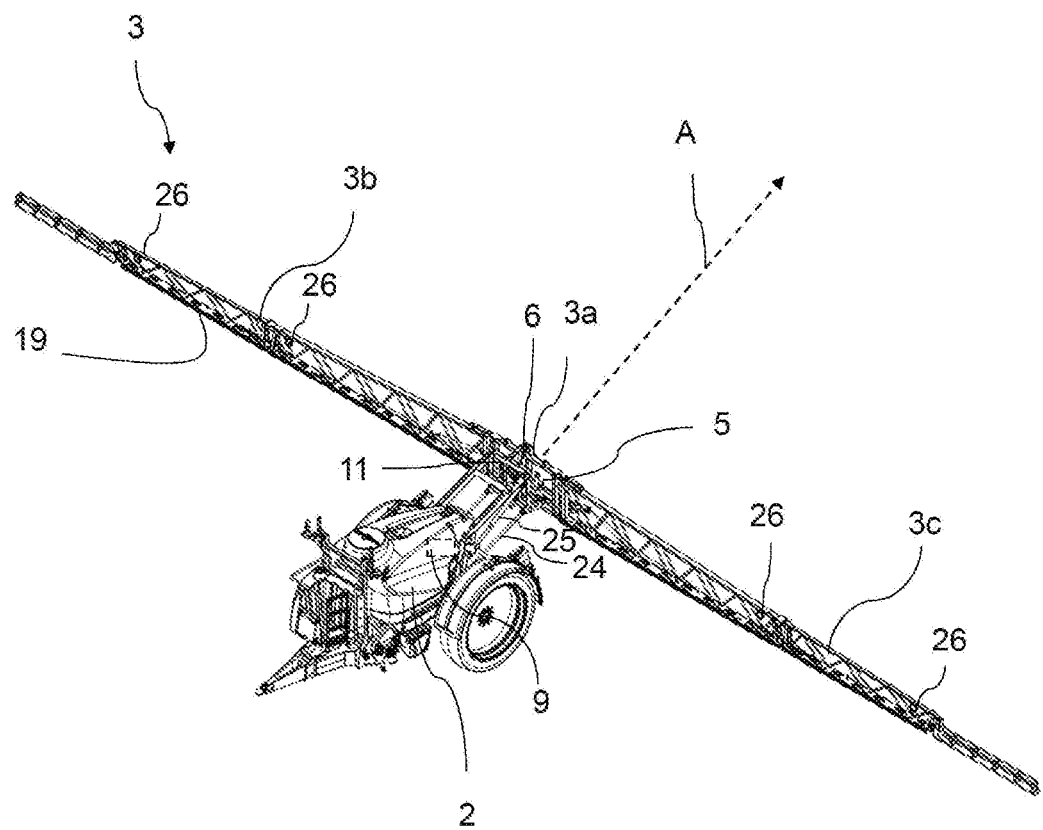
FIG. 1 is a perspective view of an agricultural distribution machine depicted in accordance with an exemplary embodiment.

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function. Elements which are identical or functionally equivalent are provided in all of the figures with the same reference numerals and in some cases not specifically described.

FIG. 1 shows a perspective view of an agricultural distribution machine 1 according to an exemplary embodiment. The agricultural distribution machine is by way of example designed as a towed field sprayer. The distribution machine 1 comprises a carrier vehicle 2 and a distributor boom 3 for spreading fertilizer or plant protection agent. The distributor boom 3 is arranged on the carrier vehicle 2 so as to be movable at least about a pivot axis A running in the direction of travel, illustrated by the dashed line. The distributor boom 3, in a field sprayer denoted as a spraying boom, comprises a central part 3a and two cantilevered arms 3b, 3c protruding on either side of the carrier vehicle 2. Spray nozzles and/or nozzle components 19 are arranged so as to be distributed and spaced apart along the spraying boom and are fluidically connected via lines to a spraying agent tank arranged in the carrier vehicle 2. In each case two distance sensors in the form of ultrasonic sensors 26 are also arranged on each cantilevered arm 3b, 3c, said distance sensors measuring the distance of the boom from the ground and/or from the plant population.

The distribution machine 1 further comprises a sensor apparatus 5 (first sensor apparatus) for determining an angular rate of the distributor boom 3. The sensor apparatus 5 comprises, in the embodiment shown, an angular rate sensor 5 in the form of a gyroscope arranged on the distributor boom, for example in the region of the central part 3a of the distributor boom 3. Moreover, a second sensor apparatus for detecting a rotational position of the distributor boom 3 is provided. The second sensor apparatus in the present case is designed as a rotation angle sensor 6 for detecting a relative rotation between the carrier vehicle 2 and the distributor boom 3. The rotation angle sensor 6 is arranged between the carrier vehicle 2 and the distributor boom 3.

The distributor boom 3 is fastened to the carrier vehicle 2 via a frame-like carrier 11. In this case, the distributor boom is suspended on a suspension 11a of the carrier 11 and pivotably fastened thereby to the carrier 11. The carrier 11 is attached in a height-adjustable manner to the carrier vehicle 2 and/or attached in a height-adjustable manner relative to a ground surface by means of a parallelogram linkage 24. For the height adjustment the parallelogram linkage 24 is assigned a linear drive 25 in the form of a hydraulic or pneumatic cylinder such that the vertical distance between the distributor boom 3 and a ground surface and/or a plant population is able to be changed in a variable manner. The carrier 11 is not pivotable about the pivot axis A but the distributor boom 3 is arranged on the suspension 11a on the carrier 11 so as to be pivotable about the rotational axis A. The fastening and suspension, shown here, of the distributor boom 3 on the carrier vehicle 2 is merely by way of example.

A plurality of other types of suspension of distributor booms on the carrier vehicle are known in the art and could also be alternatively used.

Figure 2:
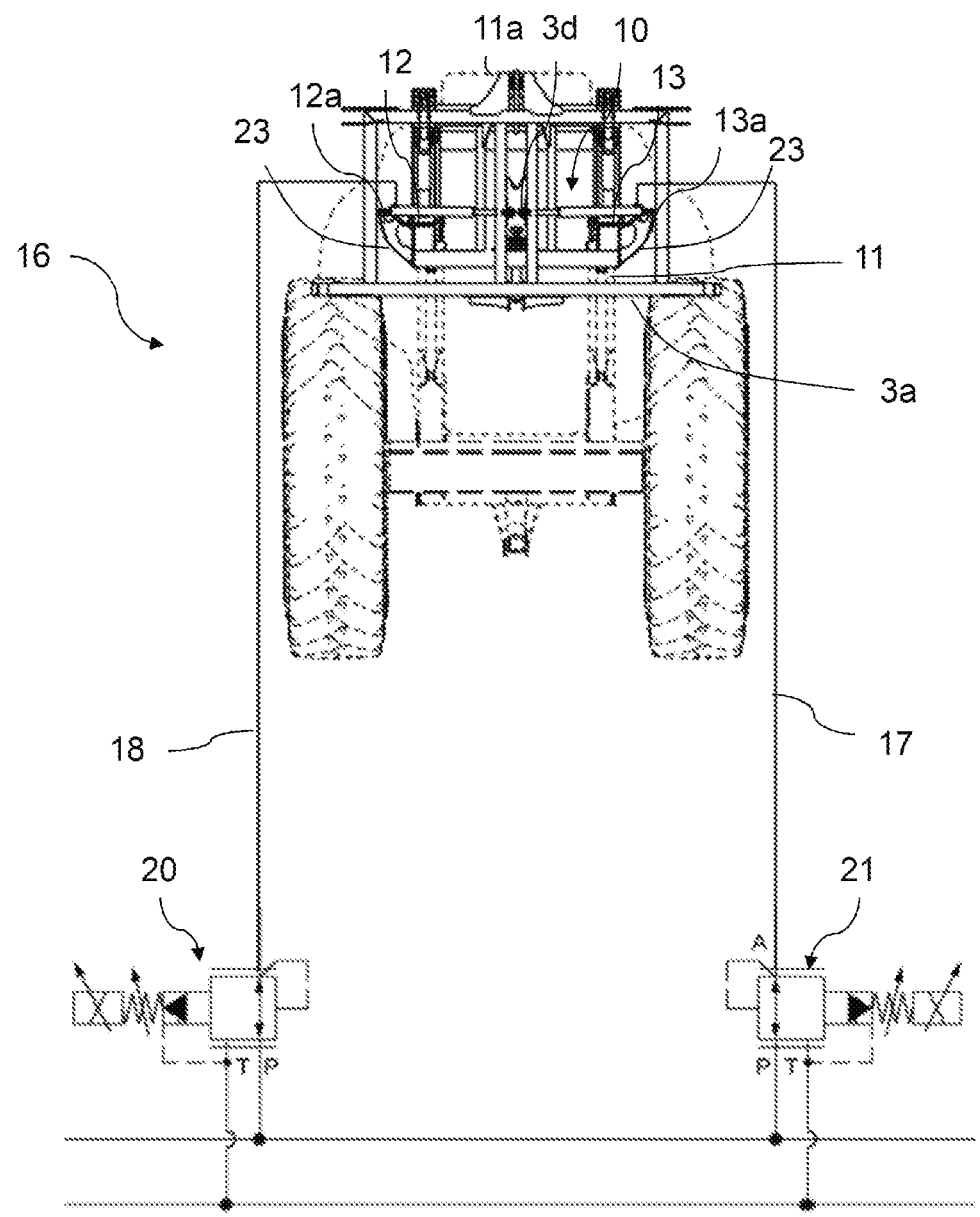
FIG. 2 is a detailed view of a distributor boom on a frame with a pressure medium-actuated controlling apparatus depicted in accordance with an exemplary embodiment.
Figure 3:
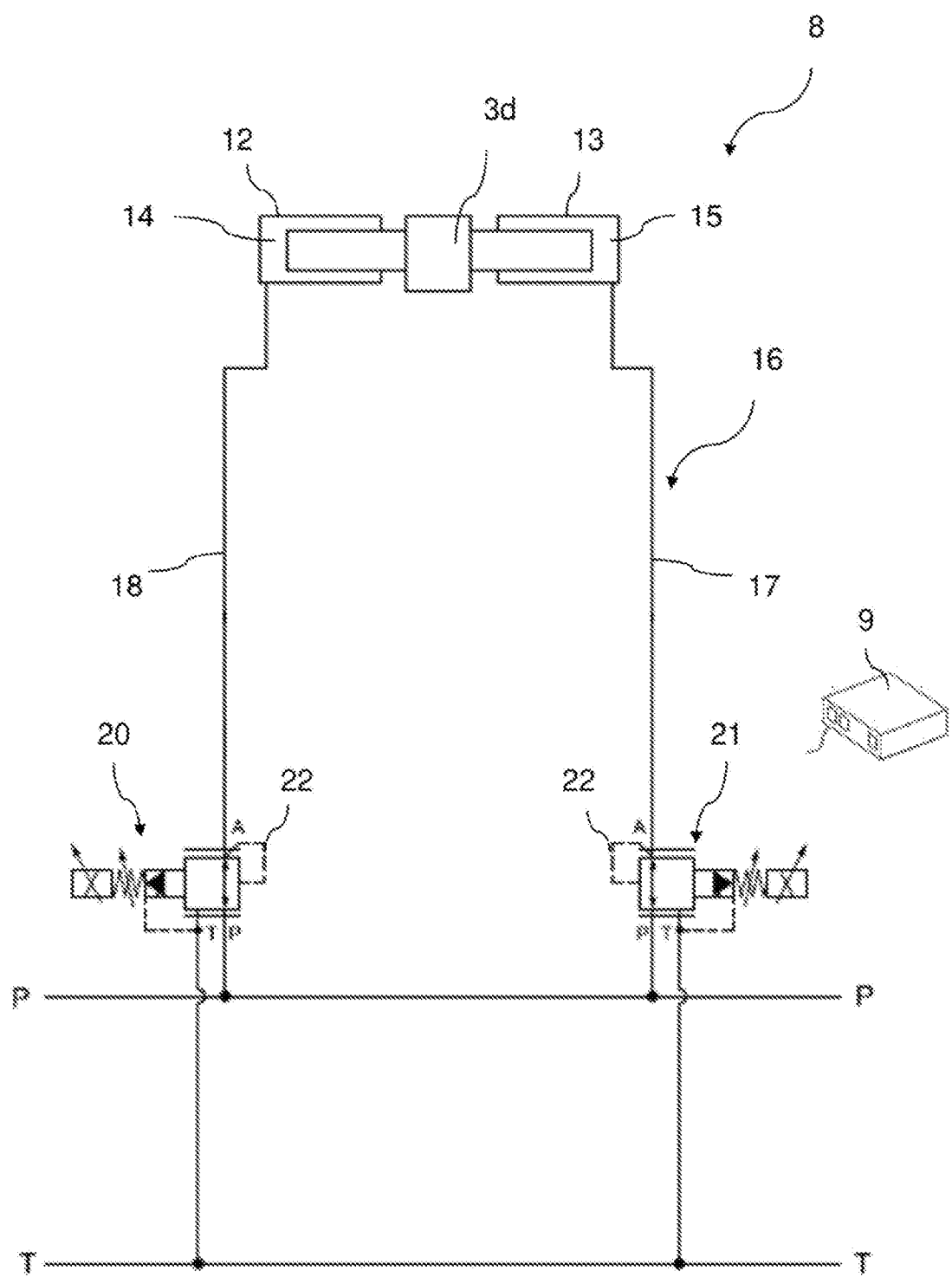
FIG. 3 is a schematic view of a control apparatus and the pressure medium-actuated controlling apparatus of an agricultural distribution machine depicted in accordance with an exemplary embodiment.

The distribution machine 1 further comprises a control apparatus 9 for controlling and/or regulating a rotational position of the distributor boom 3 about the pivot axis A, wherein to this end the control apparatus 9 activates a pressure medium-actuated controlling apparatus 8. The control apparatus and the controlling apparatus 8 are shown schematically in FIG. 3. The pressure medium-actuated controlling apparatus 8 comprises two substantially opposingly acting effective regions 14, 15, a controlling force being able to be produced thereby in order to move the distributor boom 3 in a targeted manner about the pivot axis A. This may be identified in the detailed view of FIG. 2 and also of FIG. 3.

For forming the two effective regions 14, 15 the controlling apparatus 8 comprises a controlling member 10 in the form of a linear actuator, in this case by way of example as two single-acting, opposingly arranged hydraulic or pneumatic cylinders 12, 13 (also denoted as controlling cylinders). The controlling cylinders 12, 13 are also designed in this case as plunger cylinders. The plunger cylinders are fastened on their housing-side end 12a, 13a to a portion 23 of the carrier 11 protruding in a U-shaped manner. The controlling cylinders 12, 13 are attached to the distributor boom 3 at the front end of the piston rod on a portion 3d of the central part 3a of the distributor boom 3a.

The effective region 14 (or 15) of the controlling cylinder 12 (or 13) corresponds to the region of the controlling cylinder in which the compressive force produced by the pressure medium is converted into a movement of the piston rod of the controlling cylinder 12, 13.

For generating a pressure acting on the piston rod of the controlling cylinders 12, 13, the effective regions 14, 15 are connected to a pressure medium circuit 16. To this end, one respective pressure medium line section 17, 18 is connected to each effective region 14, 15, a pressure medium, for example air or hydraulic fluid, being able to be supplied thereby to the effective regions 14, 15 and removed therefrom. In each case a pressure control valve 20, 21 is arranged in each pressure medium line section 17, 18 for controlling a pressure prevailing at the respective effective region 14, 15. The two pressure control valves 20, 21 are designed as electromagnetically activated proportional pressure control valves. Further components of the fluid circuit, such as the pump and fluid reservoir, are designed in a manner known per se and not shown.

The two controlling cylinders 12, 13 are arranged opposingly to one another so that two substantially opposingly acting effective regions 14, 15 are formed. This means that a compressive force of the pressure medium in the one effective region 14 and/or the one controlling cylinder 12 produces a displacement force on the distributor boom in the one direction about the pivot axis and a compressive force of the pressure medium in the other effective region 15 and/or the other cylinder 13 produces a displacement force on the distributor boom in the opposing direction about the pivot axis. The pressure and correspondingly the controlling force in the effective region 14 is set by the pressure control valve 20. The pressure and accordingly the controlling force in the effective region 15 is set by the pressure control valve 21. By regulating the pressure of the pressure medium prevailing at the effective regions 14, 15 and/or the controlling cylinders 20, 21, therefore, the rotational position of the distributor boom 3 may be influenced.

Figure 4:
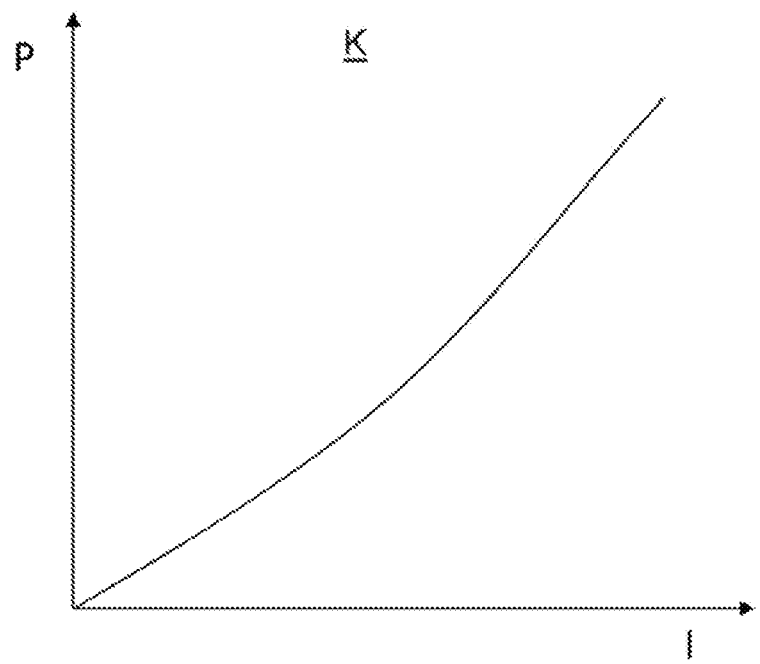
FIG. 4 is a graph of a characteristic curve for activating pressure control valves depicted in accordance with an exemplary embodiment.

A characteristic curve K is stored in the control apparatus 9 for each of the pressure control valves 20, 21, said characteristic curve establishing a connection between the predetermined target value, for example, of a pressure P to be generated at the effective regions, and an electrical activation signal of the pressure medium control valves 20, 21, for example the current I applied thereto, which is illustrated schematically in FIG. 4. The control apparatus 9 is configured, in each case electrically controlled using the characteristic curve K, to set the pressure medium control valves 20, 21 to the predetermined target value.

Figure 5:
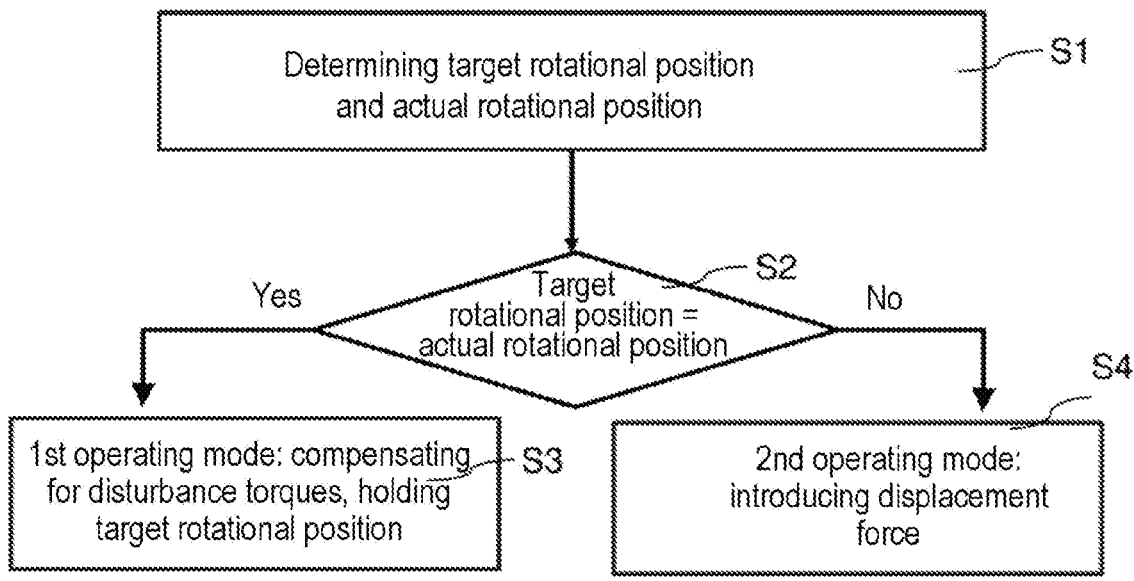
FIG. 5 is a schematic block diagram illustrating the control or regulation of rotational position of a distributor boom depicted in accordance with an exemplary embodiment.

The mode of operation of the control or regulation of the rotational position of the distributor boom 3 is illustrated by way of example with reference to FIGS. 5 to 9. FIG. 5 shows initially a schematic block diagram for illustrating the regulation of the rotational position of the distributor boom 3 according to an exemplary embodiment. During working operation of the agricultural distribution machine, i.e. when the distributor boom 3 is in the folded-out state and thus is in the working position, it is necessary to set the rotational position thereof to a desired target rotational position in order, for example, to set a uniform distance of the spray nozzles from the plant population. To this end, the control apparatus 9 is designed in terms of program technology to monitor continuously whether the current rotational position of the distributor boom 3 corresponds to the desired target rotational position. To this end, initially the target rotational position and the present rotational position of the distributor boom 3 are determined (step S1 in FIG. 5).

The target rotational position may be determined, for example, by using the measured values of the ultrasonic sensors 19 which determine the distance of the distributor boom at the measuring points of the ultrasonic sensors 19 from the ground and/or from the plant population. The target rotational position may also be predetermined in a different manner, for example by a user input.

The control apparatus 9 further determines the present angular rate of the distributor boom 3, for example, using the measured values of the rotation angle sensor 6.

In step S2 it is monitored whether the determined present rotational position of the distributor boom 3 corresponds to the target rotational position. This is the case when the present rotational position corresponds to the target rotational position or alternatively no longer deviates from the target rotational position as a predetermined threshold value.

If the determined present rotational position of the distributor boom 3 corresponds to the target rotational position, in step S3 an operating mode (first operating mode) is implemented by the control apparatus 9 in which the distributor boom 3 is held in its current rotational position.

When travelling on uneven terrain, which is generally the case on agricultural land, however, the carrier vehicle 2 continuously rolls approximately about the axis A, which is also parallel to the direction of travel of the carrier vehicle. These rolling movements of the carrier vehicle 2 generate disturbance torques, which also in the case of the distributor boom 3 suspended in a rocking manner, and due to the mechanical coupling, are at least partially transmitted via the controlling apparatus 8 to the distributor boom 3 and may lead to undesired rotations occurring of the distributor boom 3 from the target rotational position.

In spite of such disturbance torques the first operating mode S3 serves to hold the distributor boom 3 in the currently set target rotational position in which disturbance torques acting on the distributor boom, which result from movements of the carrier vehicle about the longitudinal axis, may be compensated in order to hold the target rotational position. In the present exemplary embodiment, this takes place by means of two superimposed regulating circuits which act simultaneously and in this manner may compensate for disturbance torques rapidly and reliably before these torques lead to noticeable deviations of the rotational position of the distributor boom 3 from the target rotational position. This leads to the distributor boom 3 being substantially decoupled from torques about the pivot axis A, resulting from vehicle movements about the vehicle longitudinal axis.

Figure 6:
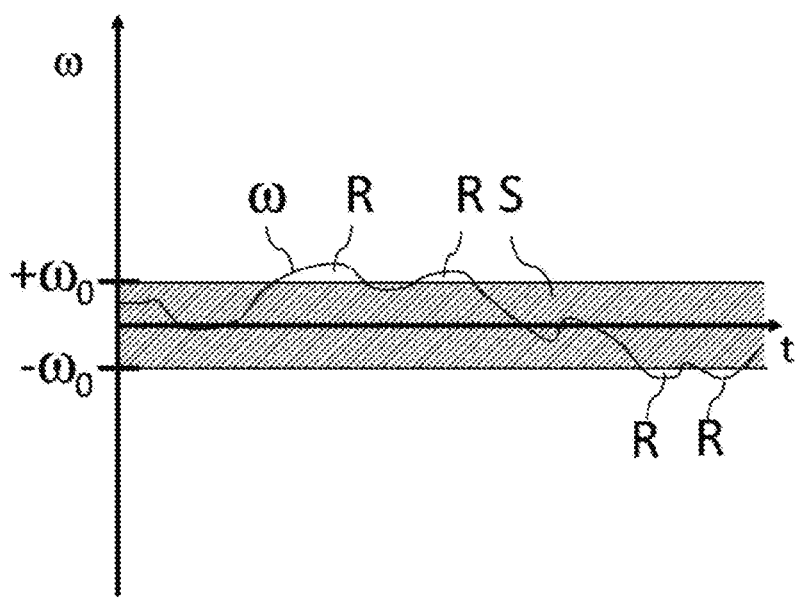
FIG. 6 is a schematic block diagram illustrating an angular rate-based regulation in a first operating mode depicted in accordance with an exemplary embodiment.
Figure 7:
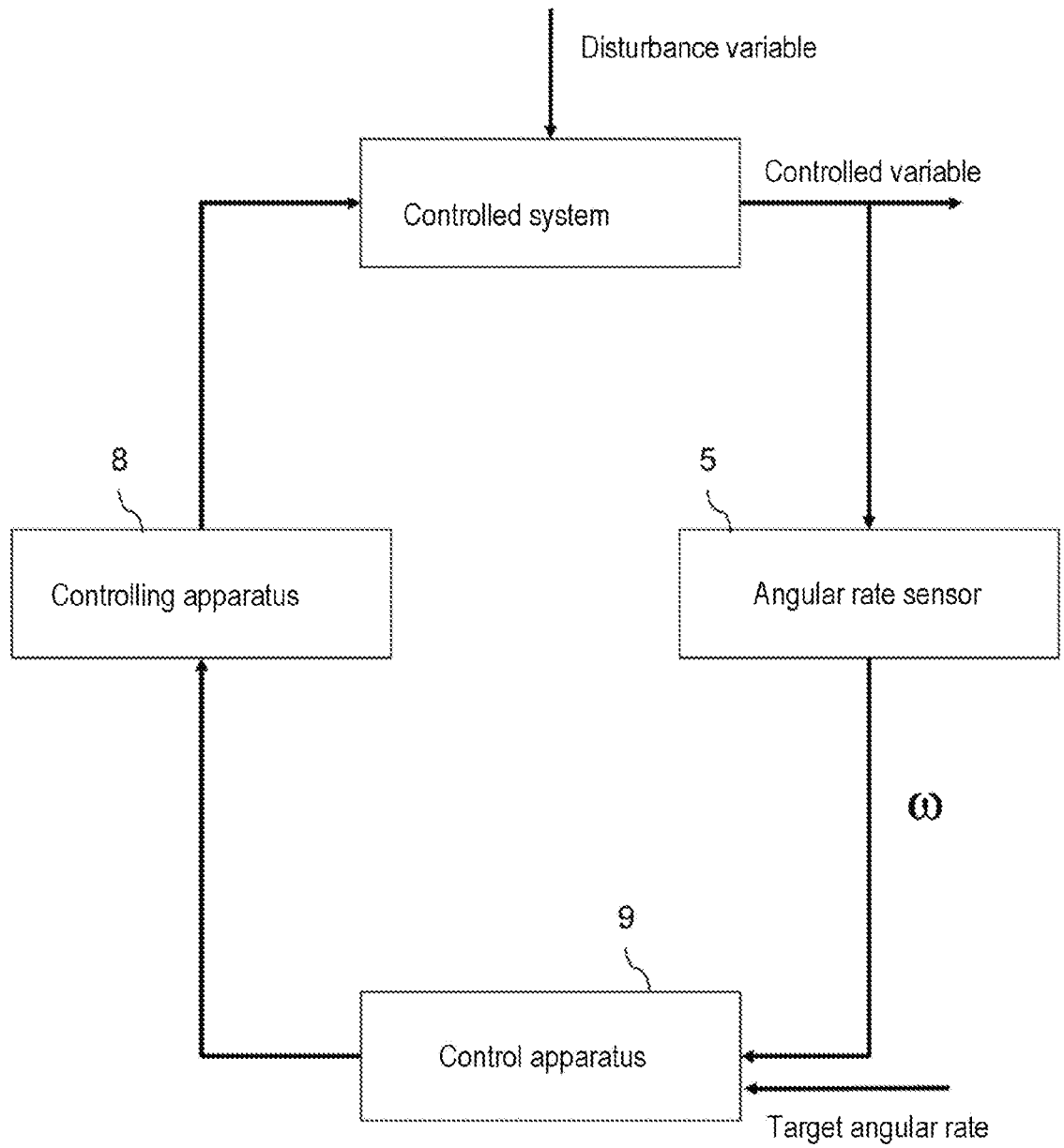
FIG. 7 is a block diagram illustrating an angular rate-based regulation in a first operating mode depicted in accordance with an exemplary embodiment.

A first regulating circuit 7 comprises the controlling apparatus 9, the first sensor apparatus (angular rate sensor) 5 for determining the controlled variable and the controlling apparatus 8 for controlling the controlled system, see also FIGS. 6 and 7, which illustrate the first regulating circuit 7. The first regulating circuit 7 regulates the angular rate $\omega$ detected by the first sensor apparatus 5 as a controlled variable to a target value which has a value of between zero and a threshold value $\omega_0$. In other words, during the first operating mode, the angular rate is controlled to remain within a target range S around zero, the lower and upper limits of the target range are defined by $-\omega_0$ and $+\omega_0$, respectively. This range is shown in FIG. 6 by the hatched range S.

An optional second regulating circuit in the present exemplary embodiment is implemented entirely inside the controlling apparatus 8 by the pressure control valves 20, 21, which is described in more detail hereinafter.

Relating to the first regulating circuit 7, on the input side the angular rate $\omega$ determined by the angular rate sensor 5 is continuously processed by the control apparatus 9. In this case, the control apparatus 9 monitors whether the current angular rate $\omega$ is in a predetermined target value range which has an absolute value of between zero and a predetermined threshold value $\omega_0$ for the angular rate, d. h. the target value range lies between $-\omega_0$ and $+\omega_0$. The threshold value $\omega_0$ is close to zero. This range is shown in FIG. 6 by the hatched range S between $+\omega_0$ and $-\omega_0$ in which an active regulating intervention by the control apparatus 9 does not take place.

If the current angular rate $\omega$ is in the range S, it may be assumed therefrom that the target rotational position of the distributor boom is briefly maintained since the distributor boom does not rotate due to the angular rate which is close to zero.

Accordingly, the control apparatus 9 in the regulating circuit does not change an output signal for activating the control apparatus 8, i.e. an output signal for electrical activation of the pressure medium control valves 20, 21 is held constant so that the controlling force which is generated on the effective regions 14, 15 is held substantially constant. In other words, in the first operating mode and if the current angular rate $\omega$ is in the predetermined target value range S, which has a value of between zero and a predetermined threshold value $\omega_0$ for the angular rate, initially the current electrical activation signal of the pressure medium control valves 20, 21 is held constant.

If, for example, pressure peaks or force fluctuations caused by rolling movements of the carrier vehicle or by boom movements occur on the effective regions 14, 15, these are automatically compensated by the pressure medium control valves 20, 21, by the pressure or force on the effective regions 14, 15, currently predetermined via the current which is presently applied to the pressure control valves 20, 21, being held constant. The constant electrical activation signal of the pressure medium control valves 20, 21 determined by means of the characteristic curve K ensures that disturbance torques introduced into the distributor boom 3, for example resulting from rolling movements of the carrier vehicle, are in many cases immediately equalized, for example compensated, so that these disturbance torques do not lead to an undesired alteration of the rotational position and undesired displacement of the distributor boom.

The pressure control valves 20, 21 have a pressure range of 0 bar to 120 bar. So that, for example, no undesired controlling force is introduced into the distributor boom 3, for example, both effective regions 14, 15 of the controlling apparatus are subjected to a constant pressure, for example 30 bar, as a predetermined target value merely by way of example. In other words, in the first operating mode both effective regions 14, 15 and/or cylinder chambers of the controlling cylinders 12, 13 are subjected to 30 bar, for example.

If brief "pressure peaks" are produced on the effective regions 14, 15, for example due to movements of the boom, these are accordingly compensated in many cases immediately by means of the pressure control valves 20, 21 so that such brief pressure peaks may never lead to an undesired displacement of the distributor boom 3. In other words, this means that the pressure control valves 20, 21 are automatically configured to hold constant a pressure set by the control apparatus 9 on the basis of the characteristic curve K, via the corresponding current applied. This is shown by the line connection on the pressure control valve 20, 21, identified by the reference numeral 22. Additional pressure sensors are accordingly not necessary. The forces are thus automatically held in balance. Thus disturbance torques acting on the distributor boom 3, for example resulting from rolling movements of the carrier vehicle 2, may already be efficiently compensated, in many cases automatically by the pressure control valves 20, 21, before they lead as undesired controlling forces to a displacement of the rotational position of the distributor boom 3.

In this sense a further (second) regulating circuit is implemented inside the controlling apparatus 8, dictated by the mode of operation of the pressure control valves.

Only when this individual regulation of the pressure control valves 20, 21 is insufficient, for example the disturbance torques occur too intensively or too abruptly and the detected angular rate ω leaves the range S, i.e. is greater than $+\omega_0$ or lower than $-\omega_0$ (shown in FIG. 6 by the regions R) the "outer" regulating circuit 7 shown in FIG. 7 intervenes correctively. If, therefore, in the first operating mode the present angular rate ω of the distributor boom 3 rises above the threshold value $\omega_0$, the controlling apparatus 8 alters the controlling signal for the controlling apparatus 8. In this case, the electrical activation signal for the pressure control valves 20, 21 is altered such that the force generated at the effective regions 14, 15 counteracts the rotation of the distributor boom 3 with the angular rate ω so that the angular rate ω is smaller and again drops back into the range S.

In this case a further characteristic curve (not shown) stored in the control apparatus 9, which indicates the change to the current applied to the pressure medium control valves 20, 21 as function of how significantly the angular rate ω exceeds the threshold value $+\omega_0$, may be used. This characteristic curve and the aforementioned characteristic curve K, for example, may be determined and fixed in advance by experimentation for an agricultural distribution machine.

If, however, in step S2 it is determined that the current rotational position does not correspond to the target rotational position, for example since due to travelling into a sloping region a new target rotational position is predetermined, in step S4 a further operating mode (second operating mode) is implemented by the control apparatus 9, in which a defined displacement force is introduced into the distributor boom 3 in order to rotate the distributor boom into the target rotational position.

Figure 8:
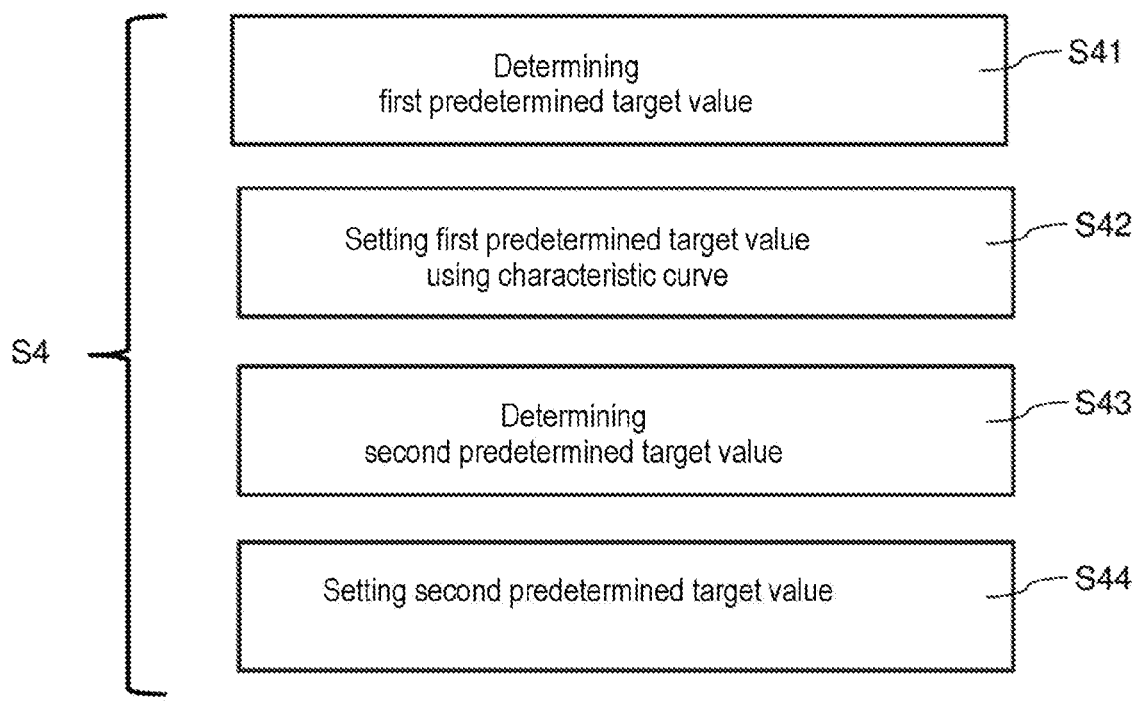
FIG. 8 is a schematic block diagram illustrating a second operating mode depicted in accordance with an exemplary embodiment.
Figure 9:
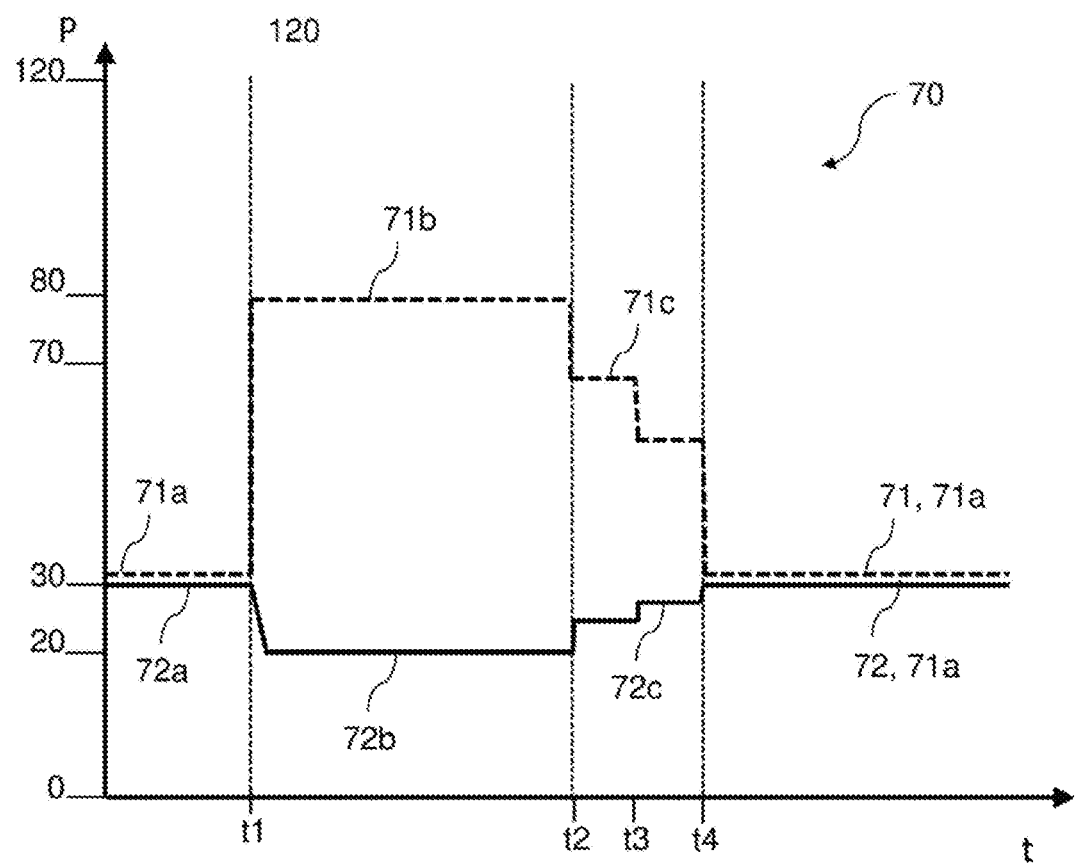
FIG. 9 is an exemplary time curve of a predetermined target value in a second operating mode depicted in accordance with an exemplary embodiment.

An embodiment of the second operating mode is shown in FIGS. 8 and 9. In FIG. 9 the dashed line 71 shows the time curve of the predetermined target value of the effective region 14 and the solid line 72 shows the time curve of the predetermined target value of the effective region 15. Until the time t1, the predetermined target value at both effective regions has the value of 30 bar (portions 71a and 72a) with the assumption that the rotational position in this time interval has not left the range S of FIG. 6, so that the distributor boom is held in the current rotational position.

If at the time t1 a new target rotational position is predetermined, initially using the deviation of the present rotational position from the target rotational position, a new predetermined target value (step S41, see FIG. 8) is determined for each effective region 14, 15 of a pressure of the pressure medium acting on the effective regions 14, 15. Using the deviation of the present rotational position from the new target rotational position and the known mass inertia of the distributor boom 3, the control apparatus 9 determines which torque has to be introduced into the distributor boom via the controlling apparatus 8 in order to reach the target position, i.e. the target rotational position. In other words, the control apparatus 9 is configured to determine a new predetermined target value, i.e. which displacement force (cylinder force) is required and/or which pressure is required on the controlling cylinders 12, 13. This predetermined target value, i.e. this pressure, is then produced on the pressure control valve (step S42) using the characteristic curve K. This predetermined target value is denoted in FIG. 8 as the first predetermined target value. On the basis of the determined value of the predetermined target value, the characteristic curve K predetermines the current applied to the pressure control valves 20, 21.

In turn, merely by way of example, the deviation of the present rotational position from the target rotational position may result in that, starting from 30 bar on both effective regions 14, 15, a pressure of 80 bar is required on the effective region 14 and a pressure of 20 bar is required on the effective region 15 in order to produce a corresponding displacement force which rotates the distributor boom into the target position. From the characteristic curve K, therefore, the corresponding values of current applied to the pressure control valves 20, 21 are produced for the new predetermined target values of 20 bar and 80 bar. Accordingly, the pressure control valves 20, 21 are electrically activated by the control apparatus 9 so that these pressure control valves, via the pressure regulation thereof automatically set the new predetermined target values on the effective regions 14, 15.

A particularity of the present embodiment, however, is that this pressure difference 80 bar−20 bar=60 bar is not held constant until, for example, the target position is reached and then regulated, by for example 30 bar, back to 30 bar, which might also alternatively be possible. Rather, these values (30 bar) which are required for holding the distributor boom 3 in the target position, are approached in a stepwise manner, in which further (second) predetermined target values in step S43 are determined and set using the characteristic curve 6 (step S44).

This is illustrated in FIG. 9 by the step-like path of the predetermined target values 71, 72 in the region between t2 and t4. Shortly before reaching the target rotational position, the control apparatus 9 incrementally reduces the predetermined target value in a step-like manner. In the present case at the time t2 the predetermined target value 71 of the effective region 14 is reduced to 70 bar and the predetermined target value 72 of the effective region 15 is increased to 25 bar. At the time t3 the predetermined target value 71 of the effective region 14 is reduced further to 60 bar and the predetermined target value 72 of the effective region 15 increased further to 28 bar. At the time t4 when reaching the target rotational position, therefore, at both effective regions 14, 15 a predetermined target value (third predetermined target value) of 30 bar is again predetermined in order to hold the distributor boom in the target rotational position which has been reached.

How these differences of the predetermined target values and/or the step-like path are defined may also be dependent on the respective rotational position. For example, optionally the number of second predetermined target values and/or the deviation thereof from the first and third predetermined target value may be fixed as a function of the deviation of the determined rotational position from the target rotational position of the distributor boom 3.

The approximation shown in FIG. 9 of the third predetermined target value by means of the second predetermined target value in order to implement the step-like path, provides the particular advantage that before reaching the target rotational position the distributor boom is actively braked and/or damped so that a rapid setting of the target rotational position is permitted, as far as possible without, or with little, overshooting.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

LIST OF REFERENCE NUMERALS

1 Agricultural distribution machine, for example towed field sprayer
2 Carrier vehicle
3 Distributor boom
3a Central part
3b, 3c Cantilevered arm
3e Fastening portion on central part
5 Angular rate sensor
6 Rotation position sensor
7 Regulating circuit
8 Pressure medium-actuated controlling apparatus
9 Control apparatus
10 Controlling member
11 Carrier
11a Suspension
12 Controlling cylinder, for example single-acting plunger cylinder
12a Fastening point
13 Controlling cylinder, for example single-acting plunger cylinder
13a Fastening point
14 First effective region
15 Second effective region
16 Pressure medium circuit
17 Pressure medium line section
18 Pressure medium line section
19 Spreading means, for example spray nozzles
20 Pressure control valve
21 Pressure control valve
22 Control line
23 Carrier portion
24 Height-adjustable parallelogram linkage
25 Lifting cylinder
26 Ultrasonic sensors
70 Predetermined target value
71, 71a-c Predetermined target value for first effective region
72, 72a-c Predetermined target value for second effective region
A Pivot axis
K Characteristic curve
R Regulating intervention
S Range without regulating intervention of control apparatus
$\omega$ Angular rate of distributor boom
$\omega_0$ Threshold value for angular rate in first operating mode

What is claimed is:

1. An agricultural distribution machine comprising:
a carrier vehicle;
a distributor boom for spreading agricultural material, which is indirectly or directly arranged on the carrier vehicle and is movable at least about a pivot axis running parallel to a direction of travel of the carrier vehicle;
a controlling apparatus configured to generate a controlling force in order to move the distributor boom about the pivot axis;
a first sensor apparatus that detects an angular rate of the distributor boom; and
a control apparatus that controls a rotational position of the distributor boom about the pivot axis, wherein the control apparatus is configured to implement a first operating mode comprising:
holding the distributor boom in a target rotational position and compensating for disturbance torques acting on the distributor boom resulting from movements of the carrier vehicle about a longitudinal axis;
determining corresponding controlling signals for activating the controlling apparatus; and
regulating the angular rate detected by the first sensor apparatus as a controlled variable to a target value which has an absolute value of between zero and a threshold value.

2. The agricultural distribution machine according to claim 1, wherein when implementing the first operating mode the control apparatus exclusively uses the angular rate detected by the first sensor apparatus as the controlled variable.

3. The agricultural distribution machine according to claim 1, wherein the first sensor apparatus is one of an angular rate sensor and a gyroscope, and detects a rotational speed of the distributor boom.

4. The agricultural distribution machine according to claim 1, wherein the threshold value is one of: less than 0.1 rad/s, less than 0.05 rad/s, and less than 0.025 rad/s.

5. The agricultural distribution machine according to claim 1, wherein the first sensor apparatus is arranged on a central part of the distributor boom.

6. The agricultural distribution machine according to claim 1, further comprising a second sensor apparatus for detecting a rotational position of the distributor boom, wherein the second sensor apparatus:
 a) comprises a rotation angle sensor arranged between the carrier vehicle and the distributor boom, the second sensor apparatus being configured to detect a relative rotation between the carrier vehicle and the distributor boom, or
 b) comprises one or more of a rotation angle sensor arranged on the distributor boom, a distance sensor unit arranged on the distributor boom, and an ultrasonic sensor unit arranged on the distributor boom which is configured to detect a distance from the distributor boom to an underlying target, the second sensor apparatus being configured to determine a rotational position of the distributor boom relative to the direction of gravitational acceleration or to the horizontal.

7. The agricultural distribution machine according to claim 1,
 wherein the controlling apparatus is a pressure medium-actuated controlling apparatus having two substantially opposingly acting effective regions, each region having an electrically-operable pressure medium control valve for controlling a pressure or volumetric flow prevailing on the respective effective region, and
 wherein the control apparatus is configured to determine, as a function of the detected angular rate, one of: a target value of a pressure acting on the effective regions and a target controlling force of the pressure medium acting on the effective regions as a controlling signal, and further configured to electrically adjust the pressure medium control valves in response to the determined target value.

8. The agricultural distribution machine according to claim 7, wherein the control apparatus is further configured to set the pressure medium control valves to the determined target value using a predetermined characteristic curve, wherein the characteristic curve relates the determined target value to an electrical activation signal of the pressure medium control valves.

9. The agricultural distribution machine according to claim 8, wherein the control apparatus is configured:
 to determine the target value without detection of a pressure value or volumetric flow value of the pressure medium; and/or
 to determine a control current for activating the pressure medium control valves exclusively using the characteristic curve and the angular rate of the first sensor apparatus or a variable calculated therefrom.

10. The agricultural distribution machine according to claim 7, wherein the controlling apparatus is configured, when activated by a constant controlling signal by the control apparatus, to compensate automatically for pressure fluctuations in the pressure medium circuit by means of the pressure control valves; and/or wherein the control apparatus is configured, if the determined angular rate is lower than the threshold value, to hold constant an electrical activation signal of the pressure medium control valves assigned to the determined target value.

11. The agricultural distribution machine according to claim 7, wherein the controlling apparatus comprises a dual-acting fluidic pressure medium cylinder or two single-acting pressure medium cylinders which operate opposingly, for forming the two substantially opposingly acting effective regions.

12. The agricultural distribution machine according to claim 11, wherein the two single-acting pressure medium cylinders comprise two plunger cylinders.

13. The agricultural distribution machine according to claim 7, wherein the controlling apparatus is configured to selectively move the distributor boom in both rotational directions about the pivot axis running in the direction of travel at an angular velocity of at least 0.1 rad/s.

14. The agricultural distribution machine according to claim 1, wherein the agricultural distribution machine is a field sprayer and the distributor boom is a spraying boom on which a plurality of spray nozzles are arranged.

15. The agricultural distribution machine according to claim 1, wherein the agricultural distribution machine is a pneumatic fertilizer spreader, wherein the distributor boom comprises a plurality of distribution elements for spreading granular fertilizer, wherein the distribution elements in each case comprise a deflector plate.

16. An agricultural distribution machine comprising:
 a carrier vehicle;
 a distributor boom for spreading material that is arranged on the carrier vehicle and is movable at least about a pivot axis running in a direction of travel of the carrier vehicle;
 a distributing boom actuator configured to generate a controlling force to move the distributor boom about the pivot axis;
 a first sensor apparatus that detects an angular rate of the distributor boom; and
 an electronic controller that controls a rotational position of the distributor boom about the pivot axis, wherein the electronic controller is configured to implement a first operating mode to hold the distributor boom in a currently set target rotational position in which disturbance torques acting on the distributor boom are compensated to hold the target rotational position, the disturbance torques resulting from movements of the carrier vehicle about a longitudinal axis, and wherein
 in the first operating mode, by determining corresponding controlling signals for activating the distributing boom actuator, the electronic controller is configured to regulate the angular rate detected by the first sensor apparatus relative to a target value as a controlled variable which has an absolute value of between zero and a threshold value.

17. The agricultural distribution machine according to claim 16, further comprising a second sensor apparatus that detects a rotational position of the distributor boom, wherein the second sensor apparatus is configured to detect a relative rotation between the carrier vehicle and the distributor boom.

18. The agricultural distribution machine according to claim 16,
 wherein the distributing boom actuator is pressure medium-actuated with two substantially opposingly acting effective regions, a controlling force being generated thereby to move the distributor boom about the pivot axis, wherein a pressure medium control valve is assigned to each effective region for controlling a pressure or volumetric flow prevailing on the respective effective region, and wherein the electronic controller is configured to identify, as a function of the detected angular rate, as a controlled variable, a predetermined target value of a pressure acting on the effective regions or a controlling force of the pressure medium acting on the effective regions as a controlling signal, and to set the pressure medium control valves, in each case by being electrically controlled, to the predetermined target value.

19. The agricultural distribution machine according to claim 18, wherein the electronic controller is configured to set the pressure medium control valves to the predetermined target value, in each case being electrically controlled using a predetermined characteristic curve of the pressure medium control valves, wherein the characteristic curve of the pressure medium control valves relates the predetermined target value to an electrical activation signal of the pressure medium control valves.

20. The agricultural distribution machine according to claim 19, wherein the electronic controller is configured to perform one of:
   identifying the predetermined target value without a pressure value or volumetric flow value of the pressure medium being detected; and
   determining a control current for activating the pressure medium control valves exclusively using the characteristic curve and the angular rate of the first sensor apparatus or a variable calculated therefrom.

21. The agricultural distribution machine according to claim 18, wherein the distributing boom actuator is configured, when activated by a constant controlling signal by the electronic controller, to compensate automatically for pressure fluctuations in the pressure medium circuit by means of the pressure control valves; and/or wherein the electronic controller is configured, if the determined angular rate is lower than the threshold value, to hold constant an electrical activation signal of the pressure medium control valves assigned to the predetermined target value.

22. The agricultural distribution machine according to claim 1, further comprising a second sensor apparatus for detecting a rotational position of the distributor boom, wherein the second sensor apparatus comprises a displacement path measuring apparatus configured to detect a displacement path of the controlling apparatus, wherein the displacement path measuring apparatus is arranged between the carrier vehicle and the distributor boom, the second sensor apparatus being configured to detect a relative rotation between the carrier vehicle and the distributor boom.

* * * * *